United States Patent
Saetow et al.

(10) Patent No.: US 10,936,222 B2
(45) Date of Patent: Mar. 2, 2021

(54) HARDWARE ABSTRACTION IN SOFTWARE OR FIRMWARE FOR HARDWARE CALIBRATION

(71) Applicant: International Business Machines Corporation, Armonk, NY (US)

(72) Inventors: Anuwat Saetow, Austin, TX (US); Stephen Glancy, Yorktown, VA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 69 days.

(21) Appl. No.: 16/445,485

(22) Filed: Jun. 19, 2019

(65) Prior Publication Data
US 2020/0401330 A1    Dec. 24, 2020

(51) Int. Cl.
   G06F 12/00    (2006.01)
   G06F 3/06     (2006.01)
   G06F 9/445    (2018.01)

(52) U.S. Cl.
   CPC ......... G06F 3/0632 (2013.01); G06F 3/0604 (2013.01); G06F 3/0659 (2013.01); G06F 3/0673 (2013.01); G06F 9/44505 (2013.01)

(58) Field of Classification Search
   None
   See application file for complete search history.

(56) References Cited

U.S. PATENT DOCUMENTS

| | | | |
|---|---|---|---|
| 9,172,604 | B1 | 10/2015 | Cohn et al. |
| 9,426,033 | B2 | 8/2016 | Cohn et al. |
| 9,472,261 | B1 | 10/2016 | Chun et al. |
| 9,552,853 | B2 | 1/2017 | Lee et al. |
| 10,192,609 | B2 | 1/2019 | Hampel et al. |
| 10,199,111 | B1 | 2/2019 | Besinga et al. |
| 10,210,102 | B2 | 2/2019 | Shaeffer et al. |
| 10,229,729 | B2 | 3/2019 | Gopalan et al. |
| 2007/0067599 | A1* | 3/2007 | Neils ............ G06F 13/1694 711/170 |
| 2009/0327562 | A1 | 12/2009 | Bellows et al. |
| 2014/0281198 | A1 | 9/2014 | Iyer et al. |
| 2018/0075887 | A1 | 3/2018 | Bialas, Jr. et al. |

(Continued)

OTHER PUBLICATIONS

Anonymous; "Enviroment Independent Testing of Hardware"; IP.com Disclosure No. IPCOM000014882D; Dec. 1, 2000; 3 pages.

(Continued)

*Primary Examiner* — Jason W Blust
(74) *Attorney, Agent, or Firm* — Cantor Colburn LLP; Bryan Bortnick (57) ABSTRACT

A computer-implemented method for calibrating DRAM is provided. A non-limiting example of the computer-implemented method includes reading, by a processor, system configuration information and disabling, by the processor, one or more steps in a list of calibration steps to be performed based on the system configuration information to leave a list of remaining calibration steps. Based on a determination that two or more remaining calibration steps are co-dependent, the method configures, by the processor, a single calibration step that encapsulates the co-dependent algorithm and places, by the processor, the single calibration step in a list of steps to be called. The method then provides, by the processor, the list of steps to be called.

20 Claims, 6 Drawing Sheets

(56) References Cited

U.S. PATENT DOCUMENTS

2018/0151243 A1  5/2018  Fung et al.
2018/0322939 A1  11/2018  Glancy et al.
2018/0357002 A1  12/2018  Prakash et al.

OTHER PUBLICATIONS

Azarkhish et al.; "A Logic-base Interconnect for Supporting Near Memory Computation in the Hybrid Memory Cube"; MICRO-47 47th IEEE/ACM International Symposium; Dec. 2014; 6 pages.

Baek et al.; "A sub-0.85V, 6.4Gbp/s/pin TX-Interleaved Transceiver with Fast Wake-up Time using 2-Step Charging Control and VOH Calibration in 20nm DRAM Process"; IEEE International Symposium on VLSI Circuits; Jun. 18-22, 2018; 2 pages.

Koo et al.; "A Versatile I/O with Robust Impedance Calibration for Various Memory Interfaces"; ISCAS IEEE International Symposium; May 21-24, 2006; 4 pages.

Mell et al.; "The NIST Definition of Cloud Computing—Recommendations of the National Institute of Standards and Technology"; U.S. Department of Commerce; Sep. 2011; 7 pages.

Schmitz et al.; "Fast Calibration and Daisy Chaining Functions in DDR4 Memory Interfaces"; XILINX All Programmable XAPP1321 (v1.1); Apr. 17, 2018; 21 pages.

* cited by examiner

HARDWARE ABSTRACTION IN SOFTWARE OR FIRMWARE FOR HARDWARE CALIBRATION

BACKGROUND

The present invention generally relates to DRAM calibration and more specifically, to hardware abstraction in software or firmware for hardware calibration.

When powering on and initializing hardware, such as a DRAM system, an associated data interface needs to be calibrated. This calibration allows the system to account for line delays as well as temperature, voltage, and frequency variation that is system dependent. Depending upon the hardware and algorithm used, training can often run into issues where good parts fail to calibrate. Often times, hardware, such as a DRAM part, will boot successfully many times but fail to calibrate other times.

SUMMARY

Embodiments of the present invention are directed to a computer-implemented method for calibrating hardware. A non-limiting example of the computer-implemented method includes reading, by a processor, system configuration information and disabling, by the processor, one or more steps in a list of calibration steps to be performed based on the system configuration information to leave a list of remaining calibration steps. Based on a determination that two or more remaining calibration steps are co-dependent, the method configures, by the processor, a single calibration step that encapsulates the co-dependent algorithm and places, by the processor, the single calibration step in a list of steps to be called. The method then provides, by the processor, the list of steps to be called.

Embodiments of the present invention are directed to a system for calibrating hardware. A non-limiting example of the system includes a processor and a memory communicatively coupled to the processor. The memory has stored therein instructions that when executed cause the processor to read system configuration information and to disable one or more steps in a list of calibration steps to be performed based on the system configuration information to leave a list of remaining calibration steps. The system, based on a determination that two or more remaining calibration steps are co-dependent, configures a single calibration step that encapsulates the two or more remaining calibration steps that are co-dependent and places the encapsulated steps in a list of steps to be called. The system provides the list of steps to be called.

Embodiments of the invention are directed to a computer program product for calibrating hardware. The computer program product includes a computer readable storage medium having program instructions embodied therewith. The program instructions are executable by a processor to cause the processor to perform a method. A non-limiting example of the method includes reading, by a processor, system configuration information and disabling, by the processor, one or more steps in a list of calibration steps to be performed based on the system configuration information to leave a list of remaining calibration steps. Based on a determination that two or more remaining calibration steps are co-dependent, the method configures a single calibration step that encapsulates, by the processor, the two or more remaining calibration steps that are co-dependent and places, by the processor, the encapsulated steps in a list of steps to be called. The method then provides, by the processor, the list of steps to be called.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
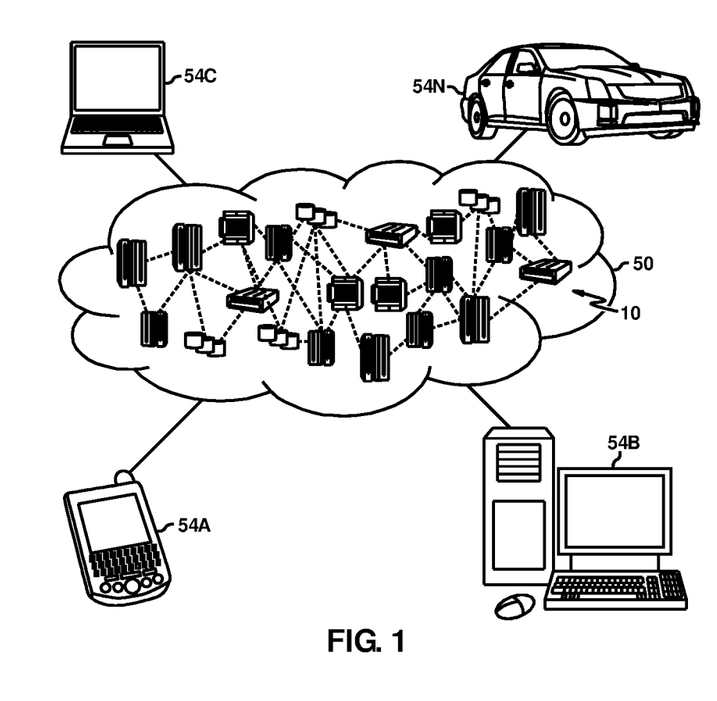
FIG. 1 depicts a cloud computing environment according to an embodiment of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
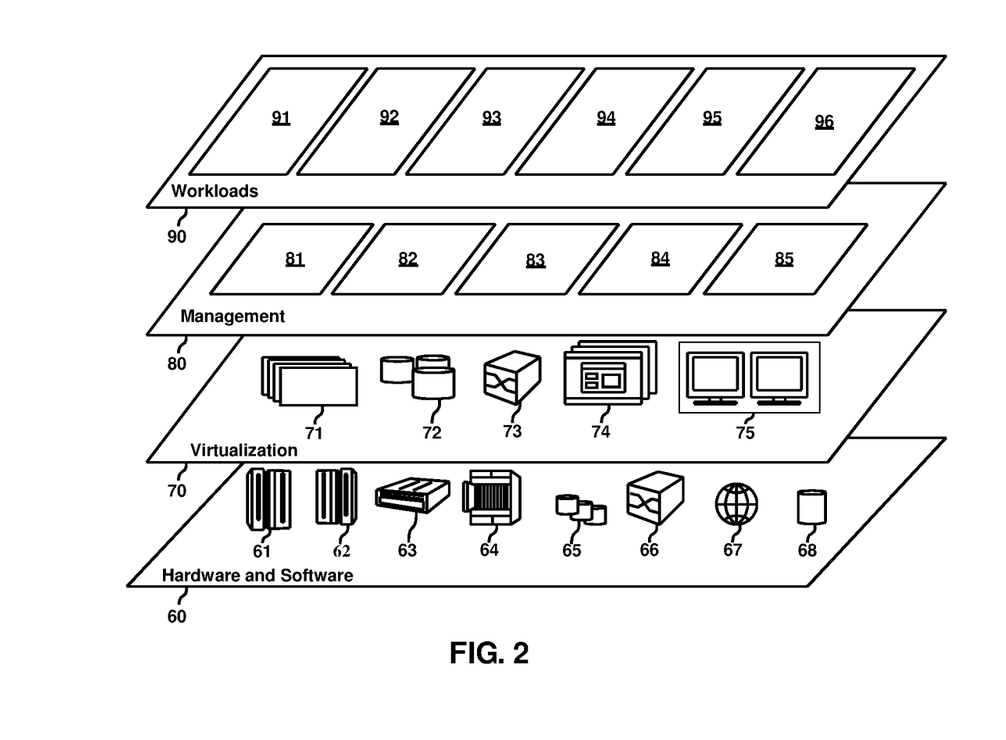
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94 calibration processing 95; and factory setup processing 96.

Figure 3:
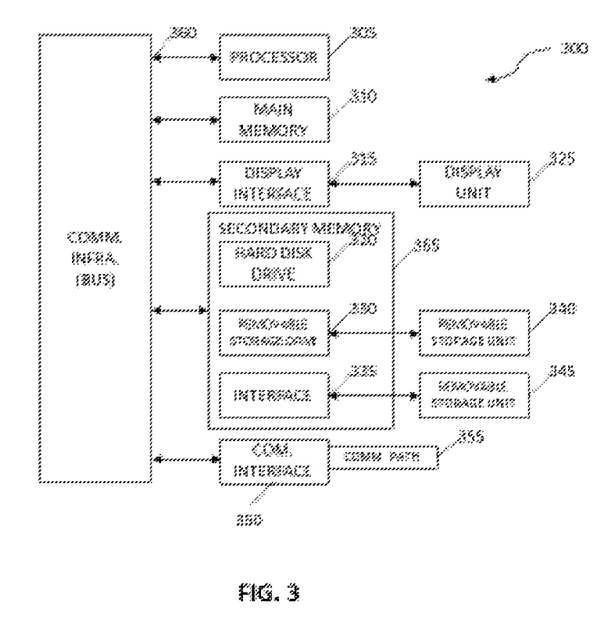
FIG. 3 depicts a high-level block diagram computer system, which can be used to implement one or more aspects of the present invention.

FIG. 3 depicts a high-level block diagram computer system 300, which can be used to implement one or more aspects of the present invention. More specifically, computer system 300 can be used to implement some hardware components of embodiments of the present invention. Although one exemplary computer system 300 is shown, computer system 300 includes a communication path 355, which connects computer system 300 to additional systems (not depicted) and can include one or more wide area networks (WANs) and/or local area networks (LANs) such as the Internet, intranet(s), and/or wireless communication network(s). Computer system 300 and additional system are in communication via communication path 355, e.g., to communicate data between them.

Computer system 300 includes one or more processors, such as processor 305. Processor 305 is connected to a communication infrastructure 360 (e.g., a communications bus, cross-over bar, or network). Computer system 300 can include a display interface 315 that forwards graphics, text, and other data from communication infrastructure 360 (or from a frame buffer not shown) for display on a display unit 325. Computer system 300 also includes a main memory 310, preferably random access memory (RAM), and can also include a secondary memory 365. Secondary memory 365 can include, for example, a hard disk drive 320 and/or a removable storage drive 330, representing, for example, a floppy disk drive, a magnetic tape drive, or an optical disk drive. Removable storage drive 330 reads from and/or writes to a removable storage unit 340 in a manner well known to those having ordinary skill in the art. Removable storage unit 340 represents, for example, a floppy disk, a compact disc, a magnetic tape, or an optical disk, etc. which is read by and written to by removable storage drive 330. As will be appreciated, removable storage unit 340 includes a computer readable medium having stored therein computer software and/or data.

In alternative embodiments, secondary memory 365 can include other similar means for allowing computer programs or other instructions to be loaded into the computer system. Such means can include, for example, a removable storage unit 345 and an interface 335. Examples of such means can include a program package and package interface (such as that found in video game devices), a removable memory chip (such as an EPROM, or PROM) and associated socket, and other removable storage units 345 and interfaces 335 which allow software and data to be transferred from the removable storage unit 345 to computer system 300.

Computer system 300 can also include a communications interface 350. Communications interface 350 allows software and data to be transferred between the computer system and external devices. Examples of communications interface 350 can include a modem, a network interface (such as an Ethernet card), a communications port, or a PCM-CIA slot and card, etcetera. Software and data transferred via communications interface 350 are in the form of signals which can be, for example, electronic, electromagnetic, optical, or other signals capable of being received by communications interface 350. These signals are provided to communications interface 350 via communication path (i.e., channel) 355. Communication path 355 carries signals and can be implemented using wire or cable, fiber optics, a phone line, a cellular phone link, an RF link, and/or other communications channels.

In the present description, the terms "computer program medium," "computer usable medium," and "computer readable medium" are used to generally refer to media such as main memory 310 and secondary memory 365, removable storage drive 330, and a hard disk installed in hard disk drive 320. Computer programs (also called computer control logic) are stored in main memory 310 and/or secondary memory 365. Computer programs can also be received via communications interface 350. Such computer programs, when run, enable the computer system to perform the features of the present invention as discussed herein. In particular, the computer programs, when run, enable processor 305 to perform the features of the computer system. Accordingly, such computer programs represent controllers of the computer system.

Turning now to an overview of technologies that are more specifically relevant to aspects of the invention, upon powering on and initializing a DRAM system, its data interface needs to be calibrated. This calibration allows the system to account for line delays as well as temperature, voltage, and frequency variation that is system dependent. Often times, a DRAM part will boot successfully many times but fail to calibrate other times. These DRAM parts will require a software workaround to allow the system to boot. While the bulk of this disclosure uses DRAM as an example of hardware that needs to be calibrated, those skilled in the art will understand after reading this description that other hardware can also benefit from the methodology described herein.

Prior solutions created a hardware abstracted training code that consisted of two parts: a factory portion and a step abstraction. The factory portion sets up a series of steps that should be run based on system configuration. The factory portion takes care of what order these steps need in order to run. Step abstraction allows the steps to be called generically. The steps take care of what needs to be performed behind the scenes. A generic step will have instruction for three parts: workarounds run before calibration; running the calibration; and workarounds for after the calibration.

Workarounds run before calibration enables or fixes items prior to running the calibration. For example, this may involve enabling or disabling refresh. When running the calibration, which includes hardware and software calibration steps, hardware is configured as needed and hardware calibrations are called. One example of this is write leveling. For the software calibration step, steps are run as needed, for example, latching in the write voltage reference ("VREF") values. Workarounds run after calibration handles errors. For example, one workaround may re-run calibration with different settings or copying working settings from another part. The workarounds run after calibration may also clean up from pre-calibration workarounds. For example, it may disable refresh if it was turned on.

The factory may configure what steps are to be run. The factory can be setup to configure tests based upon system constraints, for example, memory controller version or simulation/hardware mode enabled. A bitmap of the requested tests and system configuration information may be passed onto the factory. Steps are disables based upon this code if they are not valid. Steps are setup in the required calibration order.

In prior systems, at the factory the following method is performed: certain steps are disabled due to system configuration; for each step, each step is added in order; and a list of steps to be called is returned. Any calling code collects the system configuration and calls the factory to setup steps to be run. For each step, the step is executed, and a status is returned to the caller.

The prior system and methodologies have several problems. The prior method works fine until multiple steps need to interact in order to calibrate properly. Co-dependent steps, for example a failure of step 2 caused by bad results from step 1, are not handled by the prior methodology. These co-dependent steps greatly increase the complexity of the code interaction and the workarounds.

An example of co-dependency follows. Furthermore, steps can be used to enable a more complicated workaround. Certain advanced training algorithms can also be used where there are more stringent patterns used to train a DRAM. In a small subset of parts, these more stringent patterns can lead to errors. These errors are not considered real errors, as the part originally trained successfully. Bad read values from an advanced training read could cause an advanced training write operation to fail even if the advanced training read did not report a failure. Thus, the two calibration results are intertwined and co-dependent.

Turning now to an overview of the aspects of the invention, one or more embodiments of the invention address the above-described shortcomings of the prior art by providing hardware abstracted training code to encapsulate complicated calibration algorithms into one step. This includes two parts: the factory and the steps. The factory configures a separate step for co-dependent algorithms if both steps need to be called, and it configures an individual step if only individual steps are desired. The steps encapsulate two or more co-dependent steps which can be called or not called. If not all of the co-dependent steps are called, individual steps are called.

The above-described aspects of the invention address the shortcomings of the prior art by correcting the failure of the prior methodologies to address co-dependent steps through encapsulating the co-dependent steps. The described methodology improves code readability and maintainability. It is easy to add, remove, or change the order of calibration steps. It is easy to add workarounds, and each step only impacts itself, so that there is little chance that updating one step will break another step. In addition, each step can be tested individually, and workarounds and calibration setup and execution can be tested individually for increased test cover rate.

Figure 4:
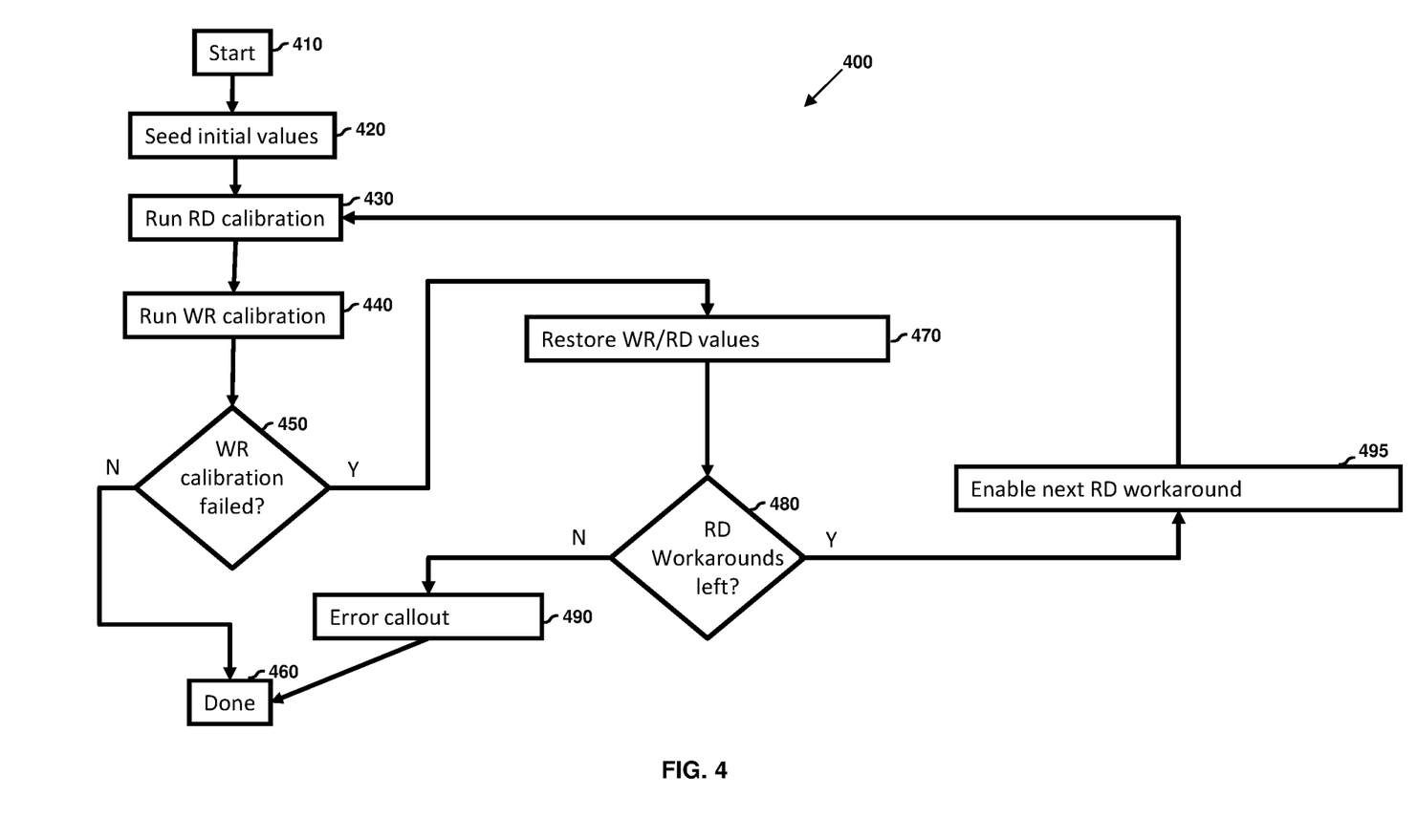
FIG. 4 depicts an example of a co-dependent algorithm according to embodiments of the invention.

Turning now to a more detailed description of aspects of the present invention, FIG. 4 depicts an example of a co-dependent algorithm according to embodiments of the invention. Workarounds operate from the most stringent to the least stringent patterns. Co-dependent algorithm 400 starts (stage 410) and initial values are seeded by processor 305 (stage 420). While discussion will continue with respect to processor 305, those skilled in the art after reading this description will understand that hardware and software 60 could also be used. A read calibration is run by processor 305 (stage 430) followed by a write calibration by processor 305 (stage 440). A check is made by processor 305 to see if the write calibration failed (stage 450). If not, the algorithm 400 ends (stage 460). If the write calibration fails (stage 450), the read and write values are restored by processor 305 (stage 470). A check is made by processor 305 to see if any read workarounds remain (stage 480), and if not an error is returned (stage 490) and the algorithm ends (stage 460). If there are read workarounds still available (stage 480), the next read workaround is enabled by processor 305 (stage 495) and flow returns to stage 430. In this way, one can see that read and write calibration are co-dependent and encapsulated together.

Figure 5:
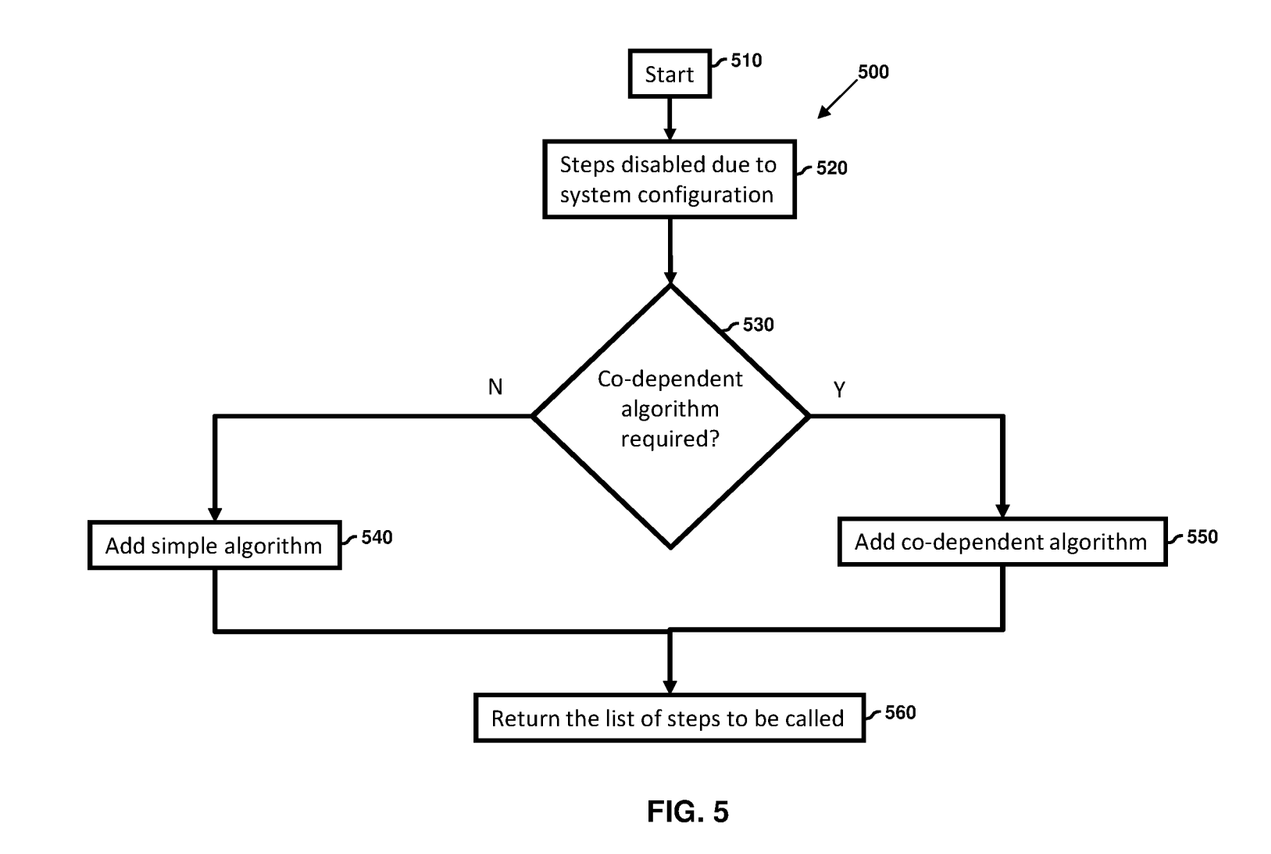
FIG. 5 depicts a flow chart for a co-dependent factory method according to embodiments of the invention.

FIG. 5 depicts a flow chart for a co-dependent factory method according to embodiments of the invention. The co-dependent factory method 500 starts (stage 510), examines by processor 305 system configuration information and disables steps based upon system configuration information (stage 520). A check is made by processor 305 throughout the series of non-disabled steps to determine if there are any co-dependent algorithms (stage 530). If none are found, only simple algorithms are added by processor 305 to a list of steps (stage 540). If any co-dependent algorithms are found, any co-dependent steps are added by processor 305 to the list of steps (stage 550). Finally, the list of steps to be called are returned by processor 305 (stage 560). In this way, co-dependent steps are identified and encapsulated.

Figure 6:
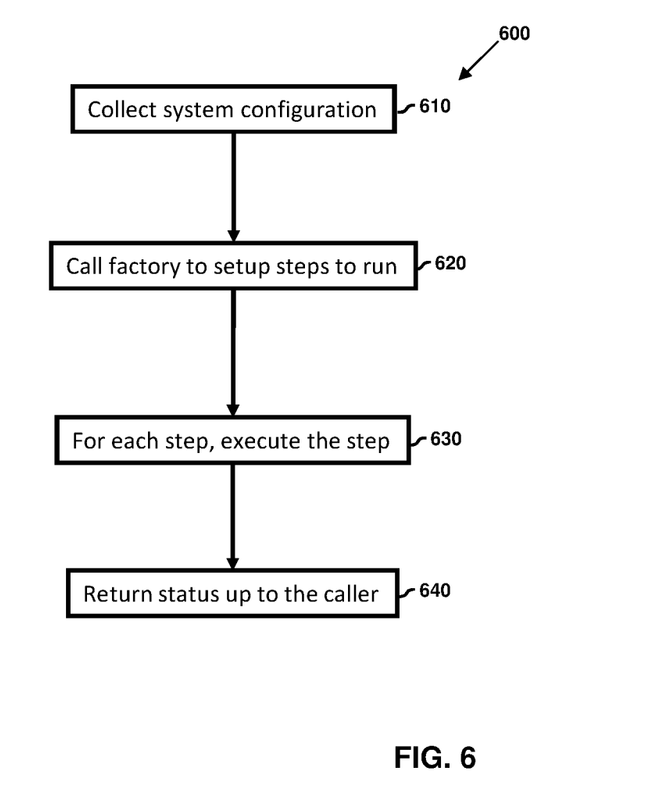
FIG. 6 depicts a flow chart for a calling code method according to embodiments of the invention.

FIG. 6 depicts a flow chart for a calling code method 600 according to embodiments of the invention. The system configuration is collected by processor 305 (stage 610). The factory is called by processor 305 to determine the steps that need to be executed and the order of execution for those steps (stage 620). For each step, which may be a single step or an encapsulated set of co-dependent steps, the step or encapsulated steps are executed by processor 305 (stage 630). This allows for verification for both individual step flows and co-dependent step flows. Helper functions can also be used to simplify the process and overall results can be checked. For hardware testing, by using debug prints, algorithm flow can be manually verified and final results checked. Status of results is returned to the caller (stage 640).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
reading, by a processor, system configuration information;
disabling, by the processor, one or more steps in a list of calibration steps to be performed based on the system configuration information to leave a list of remaining calibration steps;
based on a determination that two or more remaining calibration steps are co-dependent, configuring, by the processor, a single calibration step that encapsulates the two or more remaining calibration steps that are co-dependent;
placing, by the processor, the single calibration step in a list of steps to be called; and
providing, by the processor, the list of steps to be called.

2. The computer-implemented method of claim 1, further comprising placing, by the processor, the step in the remaining calibration steps in the list of steps to be called based on a determination that a step in the remaining calibration steps is not dependent upon another step.

3. The computer-implemented method of claim 2, further comprising retrieving, by the processor, the list of steps to be called.

4. The computer-implemented method of claim 3, further comprising executing, by the processor, each of the retrieved steps in the list of steps to be called.

5. The computer-implemented method of claim 4, further comprising determining, by the processor, the success of an executed step.

6. The computer-implemented method of claim 5, further comprising returning, by the processor, the status of the executing of the executed step in the list of steps to be called.

7. The computer-implemented method of claim 4, wherein executing further comprises providing, by the processor, a common interface for calling the list of steps to be called.

8. A system comprising:
a processor;
a memory communicatively coupled to the processor, the memory having stored therein instructions that when executed cause the processor to:
read system configuration information;
disable one or more steps in a list of calibration steps to be performed based on the system configuration information to leave a list of remaining calibration steps;
based on a determination that two or more remaining calibration steps are co-dependent, configure a single calibration step that encapsulates the two or more remaining calibration steps that are co-dependent;
place the single calibration step in a list of steps to be called; and
provide the list of steps to be called.

9. The system of claim 8, further comprising instructions that cause the processor to, place the step in the remaining calibration steps in the list of steps to be called based on a determination that a step in the remaining calibration steps is not dependent upon another step.

10. The system of claim 9, further comprising instructions that cause the processor to retrieve the list of steps to be called.

11. The system of claim 10, further comprising instructions that cause the processor to execute each of the retrieved steps in the list of steps to be called.

12. The system of claim 11, further comprising instructions that cause the processor to determine the success of an executed step.

13. The system of claim 12, further comprising instructions that cause the processor to return the status of the executing of the executed step in the list of steps to be called.

14. The system of claim 9, further comprising instructions that provide a common interface for calling the list of steps to be called.

15. A computer program product for calibrating DRAM, the computer program product comprising a computer readable storage medium having program instructions embodied therewith, the program instructions executable by a processor to cause the processor to:
read system configuration information;
disable one or more steps in a list of calibration steps to be performed based on the system configuration information to leave a list of remaining calibration steps;
based on a determination that two or more remaining calibration steps are co-dependent, configure a single calibration step that encapsulates the two or more remaining calibration steps that are co-dependent;
place the single calibration step in a list of steps to be called; and
provide the list of steps to be called.

16. The computer program product of claim 15, further comprising instructions that cause the processor to, place the step in the remaining calibration steps in the list of steps to be called based on a determination that a step in the remaining calibration steps is not dependent upon another step.

17. The computer program product of claim 16, further comprising instructions that cause the processor to retrieve the list of steps to be called.

18. The computer program product of claim 17, further comprising instructions that cause the processor to execute each of the retrieved steps in the list of steps to be called.

19. The computer program product of claim 18, further comprising instructions that cause the processor to determine the success of an executed step.

20. The computer program product of claim 19, further comprising instructions that cause the processor to return the status of the executing of the executed step in the list of steps to be called.

\* \* \* \* \*